June 29, 1937.  J. E. CARY ET AL  2,085,633
PLOW
Filed Jan. 19, 1937
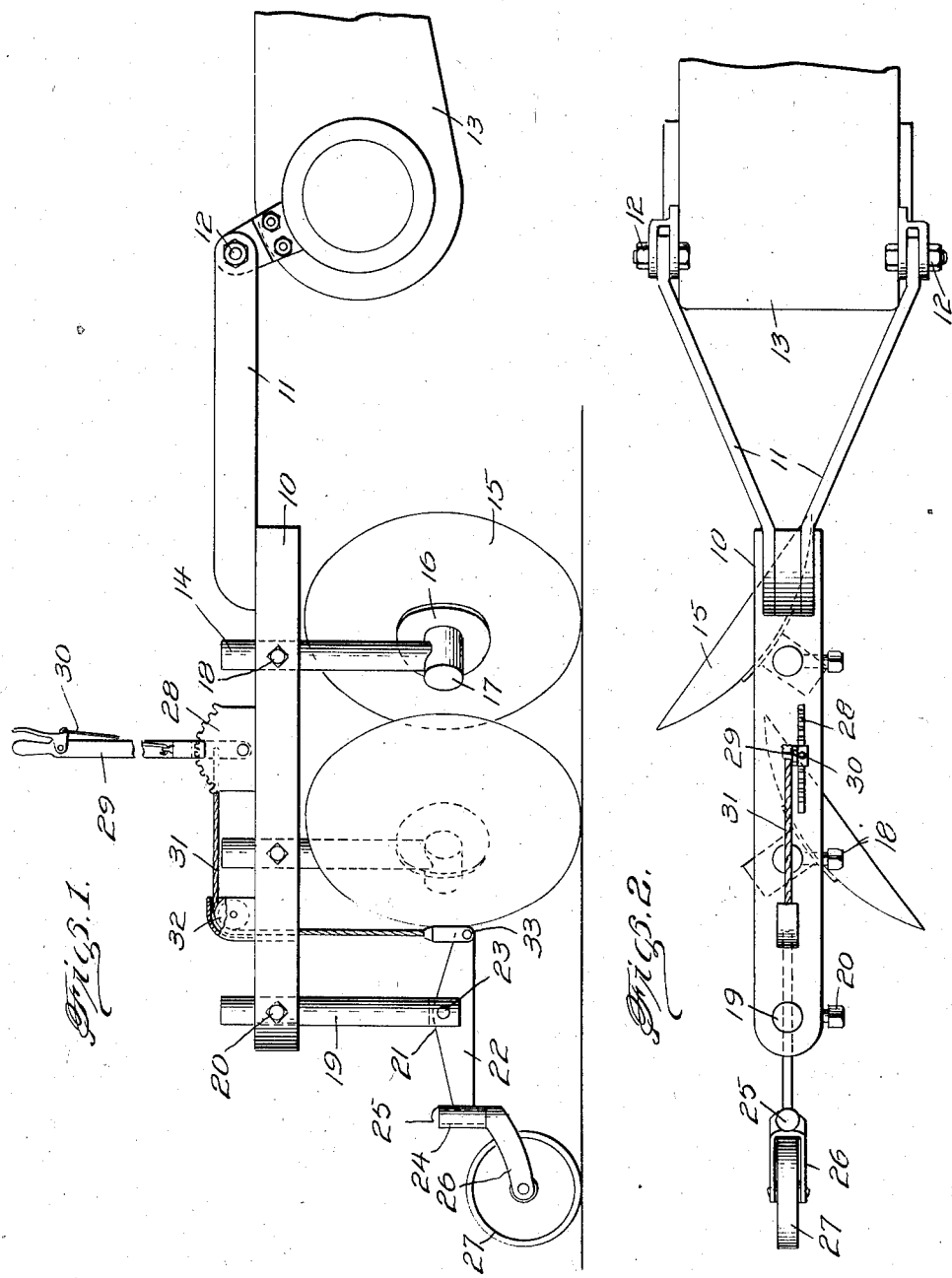
J. E. Cary and Valerie Cary.
INVENTOR
BY Victor J. Evans & Co.
ATTORNEYS Patented June 29, 1937

2,085,633

UNITED STATES PATENT OFFICE 2,085,633

PLOW

John E. Cary and Valerie Cary, Opelousas, La.

Application January 19, 1937, Serial No. 121,338

3 Claims. (Cl. 97—53)

The invention relates to a plow and more especially to a disk plow.

The primary object of the invention is the provision of a plow of this character, wherein the same is useful for fall plowing of the soil and acts for turning dirt in opposite directions and forming an intermediate soft dirt ridge.

Another object of the invention is the provision of a plow of this character, wherein the soil will be turned for turning under pea vines, grass, corn stalks, cotton stalks or cane stubbles and through the use of disks the plow when striking roots will ride over the same and immediately go into the ground again instead of sticking or wrecking the said plow which frequently occurs with the blade type plow, the plow being adjustable for pitch and height and also is susceptible of operation for the lifting of the disks out of the ground.

A further object of the invention is the provision of a plow of this character, which is extremely simple in construction, thoroughly reliable and efficient in its operation, readily and easily handled, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of a plow constructed in accordance with the invention.

Figure 2 is a top plan view thereof.

Similar reference characters indicate corresponding parts throughout the several views in the drawing.

Referring to the drawing in detail, the plow comprises a main beam 10 having at its forward end draft members 11 for pivotal connection at 12 with a tractor, a portion thereof being indicated at 13.

Adjustably fitting the beam 10 are forward and rear vertically disposed stems 14 for concaved roller disks 15, their hubs 16 being journaled upon stud axles 17 formed at the lower ends of the stems 14 and these roller disks 15 are reversely angled to each other and one in advance of the other. The stems 14 are adjustably held in the beam 10 by set screws 18.

Near the rear end of the beam 10 is fitted a standard 19 by a fastener 20 and in the lower forked end 21 of this standard is a rocking lever 22 pivoted at 23 in said forked end 21. At the rearmost end of the rocking member 22 is an upstanding bearing 24 for the swivel stud 25 of a wheel fork 26 for a colter or caster wheel 27 which is journaled therein.

Intermediate of the beam 10 and rising therefrom is a toothed keeper rack 28 to which is pivoted a throw lever 29 having a hand releasable spring tensioned latching device 30 for coaction with the rack 28. Fixed to the lever 29 is one end of an adjusting cable 31 trained over a guide pulley 32 on the beam and having connection at 33 with the forward end of the rocking member 22. Thus by operating the lever 29 the caster or colter wheel 27 can be raised or lowered for lifting the roller disk 15 out of the ground or allowing the same to plow into the latter.

In the draft of the plow the soil will be turned over in reverse directions and intermediate a soft earth ridge will be formed between the turned over runs of earth and in this manner pea vines, grass, corn stalks, cotton stalks or cane stubbles will be turned under which is required in fall plowing.

What is claimed is:

1. A plow of the kind described comprising a main beam, longitudinally spaced vertically arranged stems adjustably fitting said beam, dished reversely disposed disks horizontally journaled on said stems and arranged at opposite angles to each other, a standard fitting the rear end of said beam, a rocking member pivoted in the lower end of said standard, a caster wheel swiveled at the rearmost end of said member, and means supported by the beam and connected with the forward end of the member for rocking the same.

2. A plow of the kind described comprising a main beam, longitudinally spaced vertically arranged stems adjustably fitting said beam, dished reversely disposed disks horizontally journaled on said stems and arranged at opposite angles to each other, a standard fitting the rear end of said beam, a rocking member pivoted in the lower end of said standard, a caster wheel swiveled at the rearmost end of said member, means supported by the beam and connected with the forward end of the member for rocking the same, and means associated with the last-named means for holding it in adjusted position.

3. A plow of the kind described comprising a main beam, longitudinally spaced vertically arranged stems adjustably fitting said beam, dished reversely disposed disks horizontally journaled on said stems and arranged at opposite angles to each other, a standard fitting the rear end of said beam, a rocking member pivoted in the lower end of said standard, a caster wheel swiveled at the rearmost end of said member, means supported by the beam and connected with the forward end of the member for rocking the same, means associated with the last-named means for holding it in adjusted position, and a draft rigging at the forward end of said beam.

JOHN E. CARY.
VALERIE CARY.